(12) United States Patent
Xu et al.

(10) Patent No.: US 12,080,063 B2
(45) Date of Patent: Sep. 3, 2024

(54) DISPLAY METHOD AND DISPLAY SYSTEM FOR PLANT DISEASE DIAGNOSIS INFORMATION, AND READABLE STORAGE MEDIUM

(71) Applicant: Hangzhou Ruisheng Software Co., Ltd., Zhejiang (CN)

(72) Inventors: Qingsong Xu, Zhejiang (CN); Qing Li, Zhejiang (CN)

(73) Assignee: Hangzhou Ruisheng Software Co., Ltd., Zhejiang (CN)

( * ) Notice: Subject to any disclaimer, the term of this patent is extended or adjusted under 35 U.S.C. 154(b) by 0 days.

(21) Appl. No.: 18/418,327

(22) Filed: Jan. 21, 2024

(65) Prior Publication Data

US 2024/0153267 A1 May 9, 2024

Related U.S. Application Data

(63) Continuation of application No. PCT/CN2022/128537, filed on Oct. 31, 2022.

(30) Foreign Application Priority Data

Nov. 19, 2021 (CN) .......................... 202111410806.4

(51) Int. Cl.
*G06K 9/00* (2022.01)
*G06F 16/532* (2019.01)
(Continued)

(52) U.S. Cl.
CPC .......... *G06V 20/188* (2022.01); *G06F 16/532* (2019.01); *G06T 7/0014* (2013.01);
(Continued)

(58) Field of Classification Search
CPC ......... G06V 20/188; G06V 10/25–273; G06V 20/49; G06V 20/695; G06V 40/162;
(Continued)

(56) References Cited

U.S. PATENT DOCUMENTS

| 2015/0131867 A1* | 5/2015 | Lin ....................... G06T 7/0014 382/110 |
| 2020/0393435 A1* | 12/2020 | Gui ....................... G06V 10/764 |
| 2022/0392214 A1* | 12/2022 | Schikora ............... G06V 10/774 |

FOREIGN PATENT DOCUMENTS

| CN | 113096100 | 7/2021 |
| CN | 113112498 | 7/2021 |

(Continued)

OTHER PUBLICATIONS

"International Search Report (Form PCT/ISA/210) of PCT/CN2022/128537," mailed on Jan. 10, 2023, with English translation thereof, pp. 1-4.

*Primary Examiner* — Atiba O Fitzpatrick
(74) *Attorney, Agent, or Firm* — JCIPRNET (57) ABSTRACT

The present invention provides a display method, a display system, and a readable storage medium for plant disease diagnosis information. The method comprises: acquiring a plant image; using a disease location detection model to recognize and process the plant image, so as to determine whether the plant image has a suspected disease area; if a result recognized by the disease location detection model indicates that there is at least one suspected disease area, marking and displaying the suspected disease area according to a first preset mode; using a disease diagnosis model to recognize and process the plant image, so as to acquire species information and determine whether the plant image has a suspected disease; and if a result recognized by the disease diagnosis model indicates that there is at least one suspected disease, performing information display regarding the suspected disease according to a second preset mode.

17 Claims, 4 Drawing Sheets

(51) Int. Cl.
  *G06T 7/00*      (2017.01)
  *G06T 7/73*      (2017.01)
  *G06V 10/776*    (2022.01)
  *G06V 10/82*     (2022.01)
  *G06V 20/10*     (2022.01)

(52) U.S. Cl.
  CPC .............. *G06T 7/74* (2017.01); *G06V 10/776* (2022.01); *G06V 10/82* (2022.01); *G06T 2207/20084* (2013.01); *G06T 2207/30096* (2013.01); *G06T 2207/30188* (2013.01); *G06T 2207/30204* (2013.01)

(58) Field of Classification Search
  CPC ...... G06V 20/80; G06V 20/698; G06V 20/52; G06V 20/53; G06V 20/54; G06V 40/00; G06V 40/10; G06V 40/103; G06V 30/414; G06T 2207/30188; G06T 7/0012; G06T 7/10–194; G06T 2207/20021; G06T 2207/20112–20168; G06T 7/70; G06T 2207/30196; G06T 2207/30221; G06T 2207/30224; G06T 2207/30228; G06T 2207/30232; G06T 2207/30236; G06T 2207/30241; G06T 2207/30248; G06T 2207/30261; G06T 2207/30204; G06T 2207/30208; G06T 2210/12; G06T 11/00; G06T 11/001; G06T 11/20; G06T 11/203; G06T 11/206; G06T 11/40; G06T 11/60; G06T 2207/20221; G06T 7/0014; G06T 7/74; G06Q 50/02; A01B 79/005; A61B 5/7485; G06K 9/6224; A63B 2220/05

See application file for complete search history.

(56) References Cited

FOREIGN PATENT DOCUMENTS

| | | | |
|---|---|---|---|
| CN | 114120117 | 3/2022 | |
| JP | 2015116319 | 6/2015 | |
| KR | 20180053003 A | * 5/2018 | ....... G06F 17/30554 |

* cited by examiner

DISPLAY METHOD AND DISPLAY SYSTEM FOR PLANT DISEASE DIAGNOSIS INFORMATION, AND READABLE STORAGE MEDIUM

CROSS-REFERENCE TO RELATED APPLICATION

This application is a continuation of international PCT application serial no. PCT/CN2022/128537, filed on Oct. 31, 2022, which claims the priority benefit of China patent application No. 202111410806.4 filed on Nov. 19, 2021. The entirety of each of the above-mentioned patent applications is hereby incorporated by reference herein and made a part of this specification.

BACKGROUND

Field of the Disclosure

The disclosure relates to the technical field of object recognition, and in particular to a display method, a display system for plant disease diagnosis information and a readable storage medium.

Description of Related Art

Plants often encounter diseases, insect pests and other problems in the growth process. Currently, the above problems are normally detected and dealt with by professional personnel. However, if these conditions are not detected, serious and adverse effects might occur on plants. In the meantime, the existing display scheme for plant disease diagnosis information is not intuitive enough and there is room for improvement.

SUMMARY OF THE DISCLOSURE

One of the purposes of the present disclosure is to provide a display method for plant disease diagnosis information, and the method includes:
  acquiring a plant image;
  using a disease location detection model to recognize and process the plant image, so as to determine whether the plant image has a suspected disease area;
  if a result recognized by the disease location detection model indicates that there is at least one suspected disease area, marking and displaying the suspected disease area according to a first preset mode;
  using a disease diagnosis model to recognize and process the plant image, so as to acquire species information and determine whether the plant image has a suspected disease;
  if a result recognized by the disease diagnosis model indicates that there is at least one suspected disease, performing information display regarding the suspected disease according to a second preset mode.

In some embodiments, marking and displaying the suspected disease area includes: using a marking box to mark and display the suspected disease area.

In some embodiments, marking and displaying the suspected disease area according to a first preset mode includes: obtaining the confidence level of the marking box, and displaying at least part of the plant image centered in the marking box with the highest confidence level as the center.

In some embodiments, when the number of marking boxes with the highest confidence level is more than one, selecting the marking box whose original location is closer to the center as the centered display target.

In some embodiments, when multiple marking boxes are partially overlapped and the overlapping area exceeds ½ of any one marking box, retaining only the marking box having the highest confidence level.

In some embodiments, when the size of the marking box is smaller than the preset minimum size, the size of the marking box is set to the preset minimum size, and when the size of the marking box is larger than the preset maximum size, the size of the marking box is set to the preset maximum size.

In some embodiments, performing information display regarding the suspected disease according to the second preset mode includes: extracting diagnosis information of the suspected disease from a content management system and outputting the diagnosis information, in the case where the same determined suspected disease is found in different plant images, at least part of the diagnosis information changes along with different plant images.

In some embodiments, the at least part of the diagnosis information includes a reference image, the reference image corresponds to the suspected disease, and the reference image is similar to the plant image.

In some embodiments, the number of reference images is less than or equal to 3.

In some embodiments, extracting the diagnosis information of the suspected disease from the content management system and outputting the diagnosis information includes:
  determining the corresponding candidate reference image library according to the suspected disease in the content management system;
  in the candidate reference image library, based on the similarity with the plant image and/or the matching degree with the species information, determining the extracted one or more reference images and a priority corresponding to each of the one or more reference images; and
  outputting the one or more reference images so that the one or more reference images are arranged in sequence from high to low according to priority.

In some embodiments, in the candidate reference image library, based on the similarity with the plant image and/or the matching degree with the species information, the step of determining the extracted one or more reference images and a priority corresponding to each of the one or more reference images includes:
  searching for a candidate reference image that matches the species information of the plant image from the candidate reference image library according to the species information of the plant image and outputting and displaying the candidate reference image as the first reference image set;
  when the first reference image set is not established, searching for a candidate reference image that matches the genus information of the plant image from the candidate reference image library and outputting and displaying the candidate reference image as the second reference image set;
  when the first reference image set and the second reference image set are not established, searching for a candidate reference image that matches the family information of the plant image from the candidate reference image library and outputting and displaying the candidate reference image as the third reference image set;

when the first reference image set, the second reference image set and the third reference image set are not established, determining the preset default image corresponding to the suspected disease as the reference image.

In some embodiments, in the content management system, the step of determining the corresponding candidate reference image library according to the suspected disease includes:

when the species information of the plant image includes a result with a confidence level greater than the first preset value, determining the corresponding candidate reference image library based on the species information and the suspected disease corresponding to the species information; otherwise, determining the corresponding candidate reference image library based on the species information with the top second preset value in the confidence level ranking and the suspected disease corresponding to the species information.

In some embodiments, the step of using a disease diagnosis model to recognize and process the plant image to obtain species information and determine whether the plant image has a suspected disease includes:

pre-recognizing the plant image by using the disease diagnosis model to obtain a disease pre-recognition result;

if the confidence level of the disease pre-recognition result is less than the third preset value, outputting an interactive question associated with the disease pre-recognition result; and obtaining the answer to the interactive question, and obtaining the suspected disease result information of the plant image based on the answer.

In some embodiments, the interactive question includes at least two option branches, and the answer to the interactive question is selected from the at least two option branches.

In some embodiments, the interactive question includes at least two levels, and different option branch at the upper level corresponds to different branch question at the lower level.

In some embodiments, each of the disease pre-recognition results is associated with the at least one interactive question, or the at least two disease pre-recognition results are associated with the at least one interactive question.

In some embodiments, the method further includes:

when there are multiple suspected disease areas, using a disease diagnosis model to pre-recognize the multiple suspected disease areas, and obtaining the disease pre-recognition results of the multiple suspected disease areas respectively;

when the plurality of suspected disease areas have two or more disease pre-recognition results, the step of marking and displaying the suspected disease areas according to the first preset mode includes: performing information marking respectively on the suspected disease areas with different disease pre-recognition results;

when any of the suspected disease areas or the information marked thereon is clicked, performing information display regarding the suspected disease according to the second preset mode.

According to another aspect of the present disclosure, a readable storage medium is provided, and a program is stored in the readable storage medium. When the program is executed, the display method for plant disease diagnosis information as described above is implemented.

According to another aspect of the present disclosure, a display system for plant disease diagnosis information is provided, which includes a processor and a memory. A program is stored in the memory. When the program is executed by the processor, the display method for plant disease diagnosis information as described above is implemented.

Other features and advantages of the present disclosure will become more apparent from the following detailed description of exemplary embodiments of the present disclosure with reference to the accompanying drawings.

BRIEF DESCRIPTION OF THE DRAWINGS

The accompanying drawings, which are incorporated in and constitute a part of this specification, illustrate embodiments of the disclosure and, together with the description, serve to explain principles of the disclosure.

The present disclosure may be comprehended more clearly from the following detailed description with reference to the accompanying drawings, in which.

Note that in the embodiments described below, the same reference numerals are sometimes commonly used between different drawings to represent the same parts or parts having the same functions, and repeated description thereof is omitted. In some instances, similar numbers and letters are used to refer to similar items such that once an item is defined in one figure, it does not require further discussion in subsequent figures.

In order to facilitate understanding, the positions, dimensions, ranges, etc. of each structure shown in the drawings and the like may not represent the actual positions, dimensions, ranges, etc. Therefore, the present disclosure is not limited to the positions, dimensions, ranges, etc. disclosed in the drawings and the like.

DESCRIPTION OF EMBODIMENTS

Various exemplary embodiments of the present disclosure will be described in detail below with reference to the accompanying drawings. It should be noted that the relative arrangement of components and steps, numerical expressions, and numerical values set forth in these examples do not limit the scope of the disclosure unless otherwise specifically stated.

The following description of at least one exemplary embodiment is merely illustrative in nature and is in no way intended to limit the disclosure, its application or uses. That is, the structures and methods herein are shown in an exemplary manner to illustrate different embodiments of the structures and methods in the present disclosure. However, those skilled in the art will understand that they are merely illustrative of exemplary ways in which the disclosure may be practiced, and are not exhaustive. Furthermore, the drawings are not necessarily to scale and some features may be exaggerated to illustrate details of particular components.

Techniques, methods and devices known to those of ordinary skill in the relevant art may not be discussed in detail, but where appropriate, such techniques, methods and devices should be considered part of the authorized specification.

In all examples shown and discussed herein, any specific values are to be construed as illustrative only and not as limiting. Accordingly, other examples of the exemplary embodiments might have different values.

Figure 1:
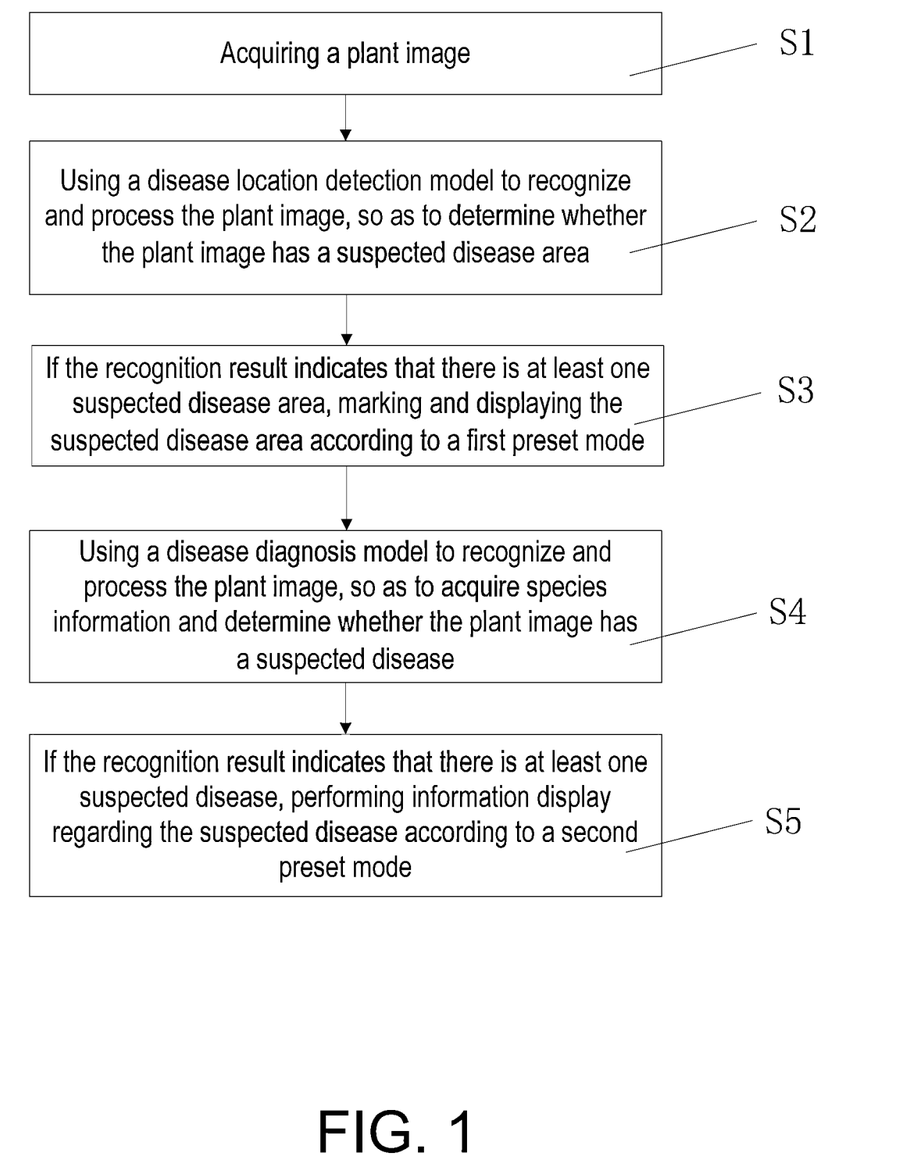
FIG. 1 shows a flow chart of a display method for plant disease diagnosis information according to an embodiment of the present disclosure.

FIG. 1 shows a flow chart of a display method for plant disease diagnosis information according to an embodiment of the present disclosure. This method may be implemented in an application (app) installed on a smart terminal such as a mobile phone or tablet computer. As shown in FIG. 1, the method may include:

Step S1: acquiring a plant image;

Step S2: using a disease location detection model to recognize and process the plant image, so as to determine whether the plant image has a suspected disease area;

Step S3: if the recognition result indicates that there is at least one suspected disease area, marking and displaying the suspected disease area according to a first preset mode;

Step S4: using a disease diagnosis model to recognize and process the plant image, so as to acquire species information and determine whether the plant image has a suspected disease;

Step S5: if the recognition result indicates that there is at least one suspected disease, performing information display regarding the suspected disease according to a second preset mode.

Each step of the display method for plant disease diagnosis information provided in this embodiment will be described in detail below with reference to the accompanying drawings and several examples.

Step S1: the plant image is acquired. In some examples, plant images may be obtained directly from those uploaded by users. In other examples, after receiving user instructions, corresponding prompt information may be generated and output to prompt the user to upload plant images. Furthermore, the prompt information may also include specific requirements for plant images, such as prompting the user to upload images of the entire plant, partial images of stems, leaves and other parts of the plant, or partial images of parts with obvious lesions, etc. In this case, multiple plant images may also be pre-processed such as marking, such as marking the whole plant image, partial plant images (including marking the parts of the plant reflected by the plant image), etc., so as to better to identify species or diagnose pests and diseases.

Step S2: the disease location detection model is used to recognize and process the plant image, so as to determine whether the plant image has a suspected disease area. The disease location detection model may be a pre-trained disease location detection model. The disease location detection model may include a neural network model, specifically a convolutional neural network model or a residual network model.

The convolutional neural network model is a deep feedforward neural network, which uses convolution kernels to scan plant images, extract the features to be recognized in the plant images, and then recognize the features of the plants to be recognized. In addition, in the process of recognizing plant images, the original plant images may be directly input into the convolutional neural network model without preprocessing the plant images. Compared with other recognition models, the convolutional neural network model has higher recognition accuracy rate and recognition efficiency.

Compared with the convolutional neural network model, the residual network model has an identity mapping layer which is not provided in the convolutional neural network model. The identity mapping layer may avoid the accuracy rate saturation or even decline as the network depth (number of stacked layers in the network) increases. The identity mapping function of the identity mapping layer in the residual network model needs to satisfy: the sum of the inputs of the identity mapping function and the residual network model is equal to the output of the residual network model. After the identity mapping is introduced, the output of the residual network model is changed more significantly, so it is possible to greatly improve the recognition accuracy rate and recognition efficiency of plant disease locations.

After the plant image is input into the disease location detection model for processing, all suspected disease areas present on the plant image may be recognized.

Figure 2:
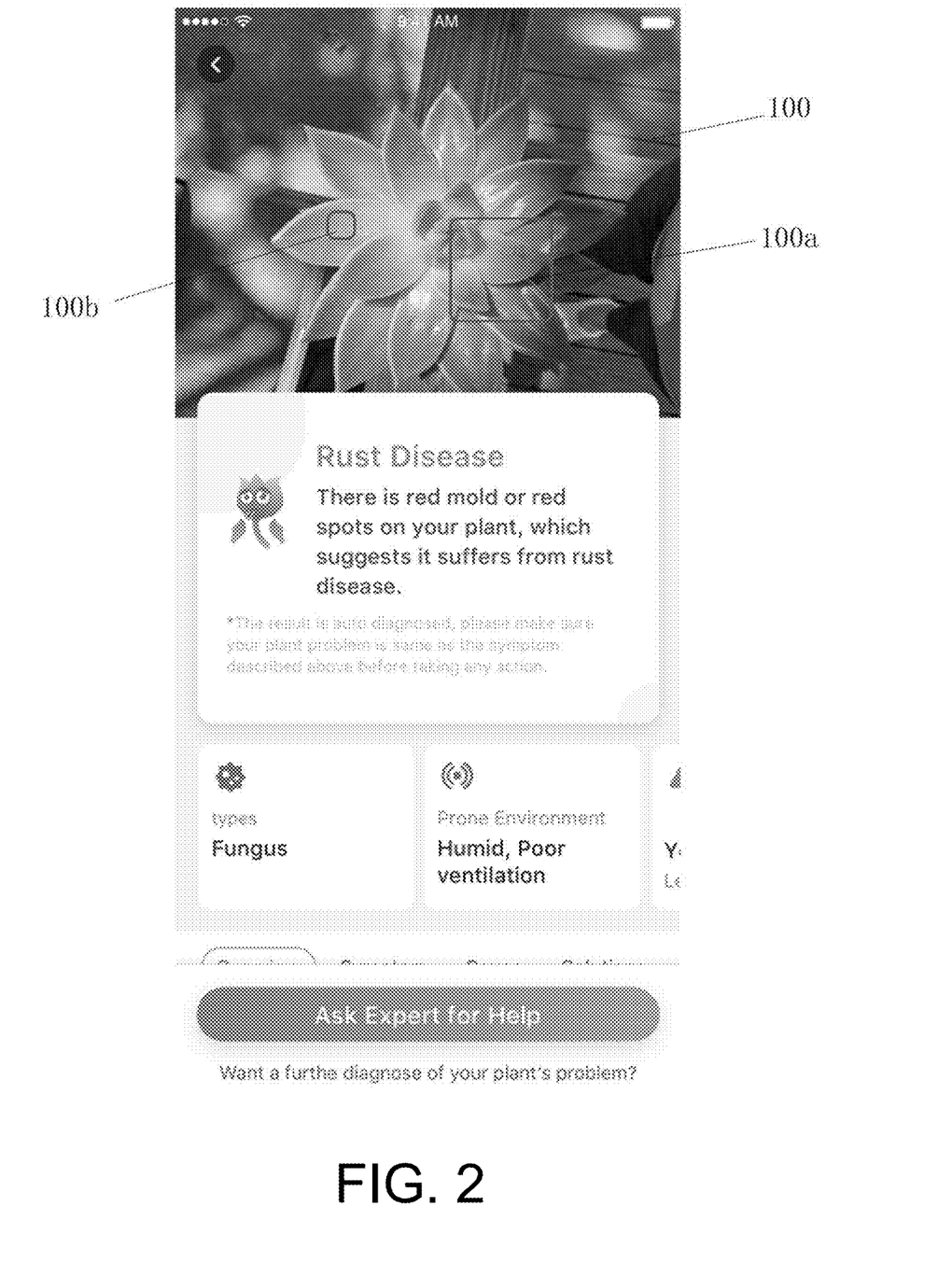
FIG. 2 shows a schematic view of marking and displaying a suspected disease area in a plant image according to an embodiment of the present disclosure.

Step S3: if the recognition result indicates that there is at least one suspected disease area, the suspected disease area is marked and displayed according to a first preset mode. In some embodiments, marking and displaying the suspected disease area includes: using a marking box to mark and display the suspected disease area. For example, a red box is used to mark the suspected disease area on the plant image. FIG. 2 shows a schematic view of marking and displaying a suspected disease area in a plant image according to an embodiment of the present disclosure. As shown in FIG. 2, multiple suspected disease areas are marked in the plant image 100, including a marking box 100a and a marking box 100b. The suspected disease areas may be intuitively and eye-catchingly marked using red boxes, so that the user is able to quickly find and determine the suspected disease areas on plant images.

In some embodiments, the step of marking and displaying the suspected disease area according to the first preset mode includes: obtaining the confidence level of the marking box, and displaying at least part of the plant image centered in the marking box with the highest confidence level as the center.

Regarding confidence level, since the disease location detection model is not 100% reliable in recognizing the suspected disease areas and might has some errors, the probability (that is, the credibility that the recognition result of the suspected disease area is close to the real disease area) that the recognition results of the suspected disease areas identified by the disease location detection model are consistent with the corresponding real disease areas is referred to the confidence level. It may be easily understood that if the confidence level is closer to 1, it means that the recognition result of the suspected disease area identified by the disease location detection model is closer to the corresponding real disease area, and the more credible the recognition result is. If the confidence level is closer to 0, it means that the recognition result of the suspected disease area identified by the disease location detection model is less credible.

In some embodiments, the plant image displayed to the user with the suspected disease area marked will be centered in the marking box with the highest confidence level as the center, and the display in the center will center the marking box with the highest confidence level to the biggest location that can be centered. Since the image has edges, other marking boxes will also affect the final display size and range of the plant image. The marking box with the highest confidence level is not necessarily exactly in the center of the plant image, so the plant image will be cropped and displayed. The cropping will cause other marking boxes to move to the outside of the captured range, that is, the screenshot image includes all marking boxes.

In some embodiments, when the number of marking boxes with the highest confidence level is more than one, the marking box whose original location is closer to the center is selected as the centered display target, so that the plant image may be modified as little as possible.

In some embodiments, when marking boxes are partially overlapped and the overlapping area exceeds ½ of any one marking box, only the marking box having the highest confidence level is retained. When such condition occurs, there is a high probability that the marking boxes in multiple overlapping areas mark the same suspected disease area, so only the marking box with the highest confidence level needs to be retained.

In some embodiments, when the size of the marking box is smaller than the preset minimum size, the size of the marking box is set to the preset minimum size, and when the size of the marking box is larger than the preset maximum size, the size of the marking box is set to the preset maximum size. Specifically, when the size of the marking box is smaller or larger than the preset size specified by vision, the width and height dimensions defined by vision shall prevail, that is, the range of a maximum and minimum marking box is limited to avoid the marking box being too large or too small, otherwise there is no point in marking the marking box and there will be a lack of aesthetic appeal. For example, the preset minimum size is limited to 10×10 px (px means pixels), and the preset maximum size may be set to a range of 5 px from the edge of the image (the preset maximum size may also be limited to a numerical value, such as setting 500×500 px as the limit, or combined with the range of 5 px from the edge of the image on basis of the above). The above numeral values are only used for illustration and are not intended to limit the scope. Those skilled in the art may adjust the numeral values on basis of the above.

Step S4: the disease diagnosis model is used to recognize and process the plant image, so as to acquire species information and determine whether the plant image has a suspected disease.

In some embodiments, a pre-trained species recognition model may be used to determine candidate species or species information based on plant images. The species recognition model may be a neural network model, specifically a convolutional neural network model or a residual network model.

The convolutional neural network model is a deep feedforward neural network, which uses convolution kernels to scan plant images, extract the features to be recognized in the plant images, and then recognize the features of the plants to be recognized. In addition, in the process of recognizing plant images, the original plant images may be directly input into the convolutional neural network model without preprocessing the plant images. Compared with other recognition models, the convolutional neural network model has higher recognition accuracy rate and recognition efficiency.

Compared with the convolutional neural network model, the residual network model has an identity mapping layer which is not provided in the convolutional neural network model. The identity mapping layer may avoid the accuracy rate saturation or even decline as the network depth (number of stacked layers in the network) increases. The identity mapping function of the identity mapping layer in the residual network model needs to satisfy: the sum of the inputs of the identity mapping function and the residual network model is equal to the output of the residual network model. After the identity mapping is introduced, the output of the residual network model is changed more significantly, so it is possible to greatly improve the recognition accuracy rate and efficiency of plant species.

In some embodiments, training a species recognition model may include:
  obtaining a first sample set having a first preset number of plant images marked with species;
  determining a first proportion of plant images from the first sample set as a first training set;
  training the species recognition model using the first training set; and
  the training ends when the accuracy rate of the first training is greater than or equal to the first preset accuracy rate, and the trained species recognition model is obtained.

Specifically, the first sample set may include a large number of plant images, and each plant image is correspondingly marked with a species. The plant image is input into the species recognition model to generate the output species, and then the relevant parameters in the species recognition model may be adjusted according to the comparison result between the output species and the marked species, that is, the species recognition model is trained and the training is completed until the accuracy rate of the first training of the species recognition model is greater than or equal to the first preset accuracy rate, thereby obtaining the trained species recognition model. Based on a plant image, the species recognition model may also output multiple candidate species, wherein each candidate species may have a corresponding species confidence level and is pending further analysis and screening.

Furthermore, the trained species recognition model may also be tested, which may include:
  determining a second proportion of plant images from the first sample set as a first test set;
  determining an accuracy rate of the first model of the trained species recognition model using the first test set; and
  when the accuracy rate of the first model is less than the second preset accuracy rate, adjusting the first training set and/or the species recognition model for retraining.

In general, the plant images in the first test set and the first training set are not exactly the same, so the first test set may be used to test whether the species recognition model also has a good recognition effect on plant images other than the first training set. During testing the accuracy rate of a first model of the species recognition model is calculated by comparing the output species generated based on the plant images in the first test set and the marked species. In some examples, the calculation method of the accuracy rate of first model may be the same as the calculation method of the accuracy rate of the first training. When the accuracy rate of the first model obtained in the test is less than the second preset accuracy rate, it indicates that the recognition effect of the species recognition model is not good enough, so the first training set may be adjusted. Specifically, for example, the number of species-marked plant images in the first training set may be increased, or the species recognition model itself may be adjusted, or both of the above may be adjusted, and then the species recognition model is retained to improve the recognition performance of the model. In some embodiments, the second preset accuracy rate may be set equal to the first preset accuracy rate.

In the same way, a pre-trained disease diagnosis model may be used to determine candidate diseases or disease information based on plant images. It should be noted that the disease information may include candidate diseases or candidate diseases not detected. The disease diagnosis model may be a neural network model, specifically a convolutional neural network model or a residual network model.

In some embodiments, training a disease diagnosis model may include:

obtaining a second preset number of second sample sets of plant images marked with disease information;

determining a third proportion of plant images from the second sample set as the second training set;

using the second training set to train a disease diagnosis model; and the training ends when the accuracy rate of the second training is greater than or equal to the third preset accuracy rate, and the trained disease diagnosis model is obtained.

Specifically, the second sample set may include a large number of plant images, and each plant image is correspondingly marked with disease information. The disease information may be, for example, the disease diagnosed on the plant in the plant image, or no disease detected from the corresponding healthy plant. The plant images in the second sample set may be at least partially the same as the plant images in the first sample set. The plant images are input into the disease diagnosis model to generate output disease information, and then the relevant parameters in the disease diagnosis model may be adjusted according to the comparison result between the output disease information and the marked disease information, that is, the disease diagnosis model is trained and the training is completed until the accuracy rate of the second training of the disease diagnosis model is greater than or equal to the third preset accuracy rate, thereby obtaining the trained disease diagnosis model. According to a plant image, the disease diagnosis model may output multiple candidate disease information, wherein each candidate disease information may have a corresponding diagnosis confidence level and is pending further analysis and screening. The diagnosis confidence level refers to the probability that the disease information corresponding to the plant image is the candidate disease information.

Furthermore, the disease diagnosis model may also be tested, which may include:

determining the fourth proportion of plant images from the second sample set as the second test set;

determining the accuracy rate of the second model of the trained disease diagnosis model using the second test set; and when the accuracy rate of the second model is less than the fourth preset accuracy rate, adjusting the second training set and/or the disease diagnosis model for retraining.

In general, the plant images in the second test set and the second training set are not exactly the same, so the second test set may be used to test whether the disease diagnosis model also has a good diagnosis effect on plant images other than the second training set. During the testing process, the accuracy rate of second model of the disease diagnosis model is calculated by comparing the output disease information generated based on the plant images in the second test set with the marked disease information. In some examples, the accuracy rate of the second model may be calculated in the same manner as the second training accuracy rate. When the accuracy rate of the second model obtained by testing is less than the fourth preset accuracy rate, it indicates that the diagnosis effect of the disease diagnosis model is not good enough, so the second training set may be adjusted. Specifically, for example, the number of plant images marked with disease information in the second training set may be increased, or the disease diagnosis model itself may be adjusted, or both of the above are adjusted, and then the disease diagnosis model is retained to improve the diagnosis effect of the model. In some embodiments, the fourth preset accuracy rate may be set equal to the third preset accuracy rate.

Of course, in some embodiments, the identification and diagnosis of species and diseases may also be implemented by the same pre-trained model, that is, the model may integrate the functions of the above-mentioned species recognition model and disease diagnosis model to directly obtain species information and determine whether the plant has suspected diseases.

In some embodiments, the step of performing recognition processing on the plant image by using the disease diagnosis model, so as to acquire species information and determine whether the plant has a suspected disease includes: pre-recognizing the plant image by using a disease diagnosis model to obtain a disease pre-recognition result; if the confidence level of the disease pre-recognition result is less than a third preset value, outputting an interactive question associated with the disease pre-recognition result; and, obtaining the answer to the interactive question, and obtaining the suspected disease result information of the plant image based on the answer.

Regarding confidence level, since the disease diagnosis model is not 100% reliable in recognizing the disease areas and might has some errors, the probability (that is, the credibility that the pre-recognition result of the disease is close to the real disease) that the pre-recognition results of the diseases identified by the disease diagnosis model are consistent with the corresponding real diseases is referred to the confidence level. It may be easily understood that if the confidence level is closer to 1, it means that the pre-recognition result of the disease identified by the disease diagnosis model is closer to the corresponding real disease, and the more credible the recognition result is. If the confidence level is closer to 0, it means that the pre-recognition result of the disease identified by the disease diagnosis model is less credible.

Optionally, taking into account the recognition accuracy rate of the plant diseases and insect pests diagnosis method and the convenience of operation, etc., the first preset value may be set and adjusted according to the actual conditions of different application scenarios. In an example, the first preset value may be set to 0.9. If the confidence level of the disease pre-recognition result is not less than the first preset value (such as ≥0.9), the credibility of the recognition result may be considered to be high, and the disease result may be obtained directly based on the disease pre-recognition result without having to use the interactive questions for confirmation. If the confidence level of the disease pre-recognition result is less than the first preset value, that is, the confidence level is less than the first preset value (such as <0.9), interactive questions will be used to assist in confirming the result to improve the accuracy rate of diagnosis of plant diseases.

Regarding obtaining answers to interactive questions, in some examples, information obtained by the user's touch, click, input or voice input may be obtained as feedback answers to interactive questions. After obtaining the user's answer to the interactive question, after selecting the option, the disease result of the plant image may be obtained, and the diagnosis information may be output, for example, the diagnosis result page may be shown.

In some embodiments, after the disease diagnosis model performs pre-recognition on a certain plant image to be diagnosed, it is possible to obtain only one disease pre-recognition result. In other words, after the disease diagnosis model performs pre-recognition on a certain plant image to be diagnosed, only one disease pre-recognition result is obtained. Alternatively, after two or more disease pre-recognition results are obtained, and only one disease pre-recognition result remains after the two or more disease pre-recognition results are filtered out through other preset conditions (such as the third preset condition, see the explanation below for details), an interactive question may be provided for this one disease pre-recognition result. After obtaining the user's answer to the interactive question, the disease pre-recognition result may be further determined as the disease result, or if the answer to the interactive question does not match the disease, the disease pre-recognition result may not be output, and the disease pre-recognition result may be further discarded to determine that the plant is free from disease and insect pests.

In some embodiments, after the disease diagnosis model performs pre-recognition on a certain plant image to be diagnosed, at least two disease pre-recognition results may be obtained. Alternatively, after multiple disease pre-recognition results are obtained, at least two disease pre-recognition results remain after the multiple disease pre-recognition results are filtered out through other preset conditions (such as the third preset condition, see the explanation below for details).

Regarding the way to output interactive questions, in some examples, prompts may pop up on the diagnosis page, such as by display or voice prompts. Those skilled in the art may set and adjust the prompts according to actual conditions.

Figure 3:
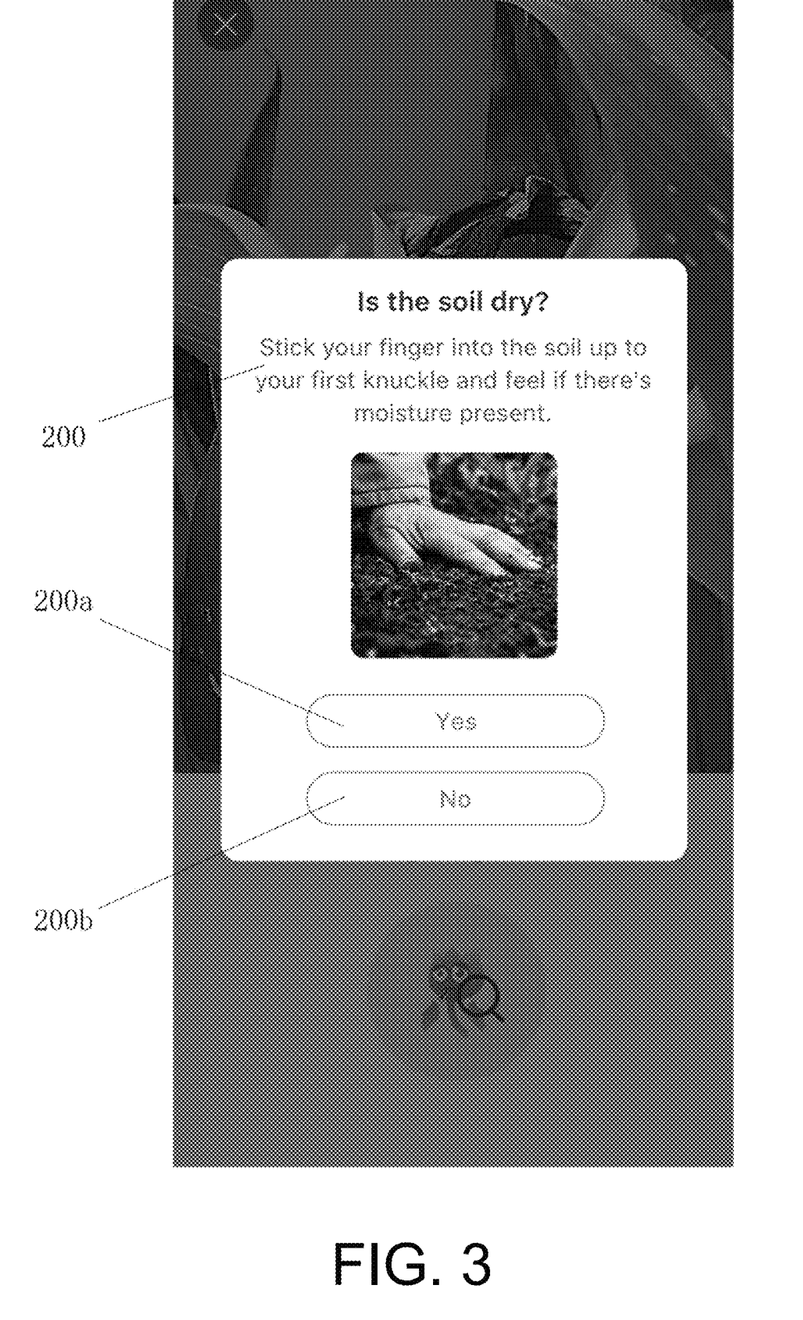
FIG. 3 shows a schematic view of an interaction question according to an embodiment of the present disclosure.

FIG. 3 shows a schematic view of an interaction question according to an embodiment of the present disclosure. As shown in FIG. 3, the method for displaying plant disease diagnosis information provided by this embodiment is explained below through an example.

First, the user uploads a plant image to be diagnosed. The plant image may be obtained through capturing performed by the user. The disease diagnosis model performs pre-recognition on the plant image and will obtain two disease pre-recognition results, which are disease A (for example, leaves turn yellow—lack of water) and disease B (for example, leaves turn yellow—overwatering), and the confidence levels of the two disease pre-recognition results are both less than the first preset value (0.9), and therefore the interactive question 200 associated with the disease pre-recognition result is triggered and output:

"Is the soil dry?
Stick your finger into the soil up to your first knuckle and feel if there's moisture present."

Preferably, please refer to FIG. 3, the interactive question includes at least two option branches, and the answer to the interactive question is selected from the at least two option branches. Two option branches may be provided for the above example: 1—Yes (denoted by 200a); 2—No (denoted by 200b), and the user will select the answer from the two option branches. Corresponding to the answers to the two option branches, if 1—Yes is selected, then disease A (leaves turn yellow—lack of water) will be confirmed as the disease result; if 2—No is selected, then disease B (leaves turn yellow—overwatering) will be determined as the disease result.

Preferably, the interactive problem may include at least two levels, and different selection branches at the upper level correspond to different branch questions at the lower level. In some embodiments, the interactive question may not only include one level, but may include at least two levels. For example, if answer A is selected from the option branches at the upper level, a branch question at the lower level based on answer A will pop up, for example, the option branches A1 and A2 for branch questions will pop up. If the user selects answer B from the option branches at the upper level, a branch question at the lower level based on answer B will pop up, for example, the option branches B1 and B2 for branch questions will pop up. In this way, it is possible to provide further assistive determining information so as to further narrow the scope of diagnosis results.

Preferably, each of the disease pre-recognition results is associated with at least one interactive question, or at least two disease pre-recognition results are associated with at least one interactive question. In some embodiments, each disease pre-recognition result may be associated with 1, 2 or more interactive questions, and the interactive question may have 1, 2 or more levels, one or more of these levels are related to 1, 2 or more branch questions. For example, a certain disease pre-recognition result is associated with two interactive questions: 1. whether there is too much water, and 2. whether there is a lack of sunlight.

In other embodiments, at least two disease pre-recognition results are associated with at least one interactive question; it may be that at least two disease pre-recognition results are associated with the same interactive question, or it may be that at least two disease pre-recognition results are associated two or more interactive questions, the embodiment provides no limitation thereto. For example, two disease pre-recognition results are associated with the same interactive question at the same time: whether there is too much water; or two disease pre-recognition results are associated with two interactive questions at the same time: 1. whether there is too much water, 2. whether there is a lack of sunlight.

Step S5: If the recognition result indicates that there is at least one suspected disease, information display regarding the suspected disease is performed according to a second preset mode.

In some embodiments, performing information display regarding the suspected disease according to the second preset mode includes: extracting diagnosis information of the suspected disease from a content management system and outputting the diagnosis information, in the case where the same determined suspected disease is found in different plant images, at least part of the diagnosis information changes along with different plant images.

The content management system (CMS) may be a software system which is between the WEB front-end and back-end systems or processes. Users may use a content management system to submit, modify, and publish content such as text files, pictures, data in databases, tables, etc. The content management system may further provide content capturing tools to automatically capture content from third parties such as text files, HTML web pages, Web services, databases, etc., and place the analyzed and processed content in the content library corresponding to the content management system itself. The content management system may also assist the WEB front-end to provide content to users in a personalized way, that is, provide a personalized portal framework to better push content to users based on WEB technology. In the content management system in the embodiment of the present disclosure, descriptive content about plants and their diseases may be stored. These descriptive contents may be text or pictures, and may include various fields, articles, etc., for example. In this way, it is possible for users to obtain introductions about plants and their diseases, such as interesting stories, uses of plants, maintenance methods and descriptions of diseases, etc., from the diagnosis information extracted and output from the content management system.

Each species information may include species name (UID1) in one-to-one corresponding relationship to distinguish different species. Similarly, each disease information may include disease name (UID2 or ComnonName) in one-to-one corresponding relationship to distinguish different diseases. When extracting relevant diagnosis information from the content management system, search may be conducted according to UID1 and UID2. When a large amount of data is pre-stored in the content management system, most diagnosis conditions may be involved to provide users with corresponding diagnosis information.

Based on the content management system, relevant information of multiple species may be output to users in the form of one species corresponding to one card. Users can switch between displaying various species and their related information by sliding cards on the interactive interface.

In some embodiments, under the condition that the same determined identification information is found in different plant images, at least part of the diagnosis information may change along with different plant images. In this way, even if the identification information obtained is the same, the output diagnosis information may be adaptively changed according to the plant image input by the user, thus achieving a more flexible output and helping to make the output diagnosis information consistent with the input of the user, thereby improving user experience and reducing confusion caused to users by mismatched input and output.

In some embodiments, diagnosis data may include diagnosis summary data and/or diagnosis detail data. In diagnosis summary data and diagnosis detailed data, the user may set different fields to store the data extracted from the content management system in the corresponding fields. The step of outputting diagnosis information may include: in the content management system, extracting corresponding data based on preset output fields according to the determined disease result to generate diagnosis information and output the diagnosis information. The preset output fields may be set by the user through an interactive interface according to their own needs, or the preset output fields may also be several relatively fixed fields. In the content management system, corresponding diagnosis data extracted according to the determined identification information may be filled in a corresponding template with a preset output format to form diagnosis information.

Preferably, if complete data cannot be extracted according to the preset output fields in the content management system, the diagnosis information may be generated by conducting search on corresponding documents.

In some embodiments, the diagnosis summary data may include at least one of a disease name corresponding to the disease name field in the preset output field and a diagnosis summary corresponding to the diagnosis summary field in the preset output field. The diagnosis detailed data may include at least one of the following: the symptom analysis corresponding to the symptom analysis field in the preset output field, the solution corresponding to the solution field in the preset output field, and the precautionary measure corresponding to the precautionary measure field in the preset output field. By storing symptom analysis, solutions, and precautionary measure in different fields, diagnosis information may be easily generated based on the content management system and it is convenient for users to see.

In some embodiments, the at least part of the diagnosis information includes a reference image, the reference image corresponds to the suspected disease, and the reference image is similar to the plant image.

Figure 4:
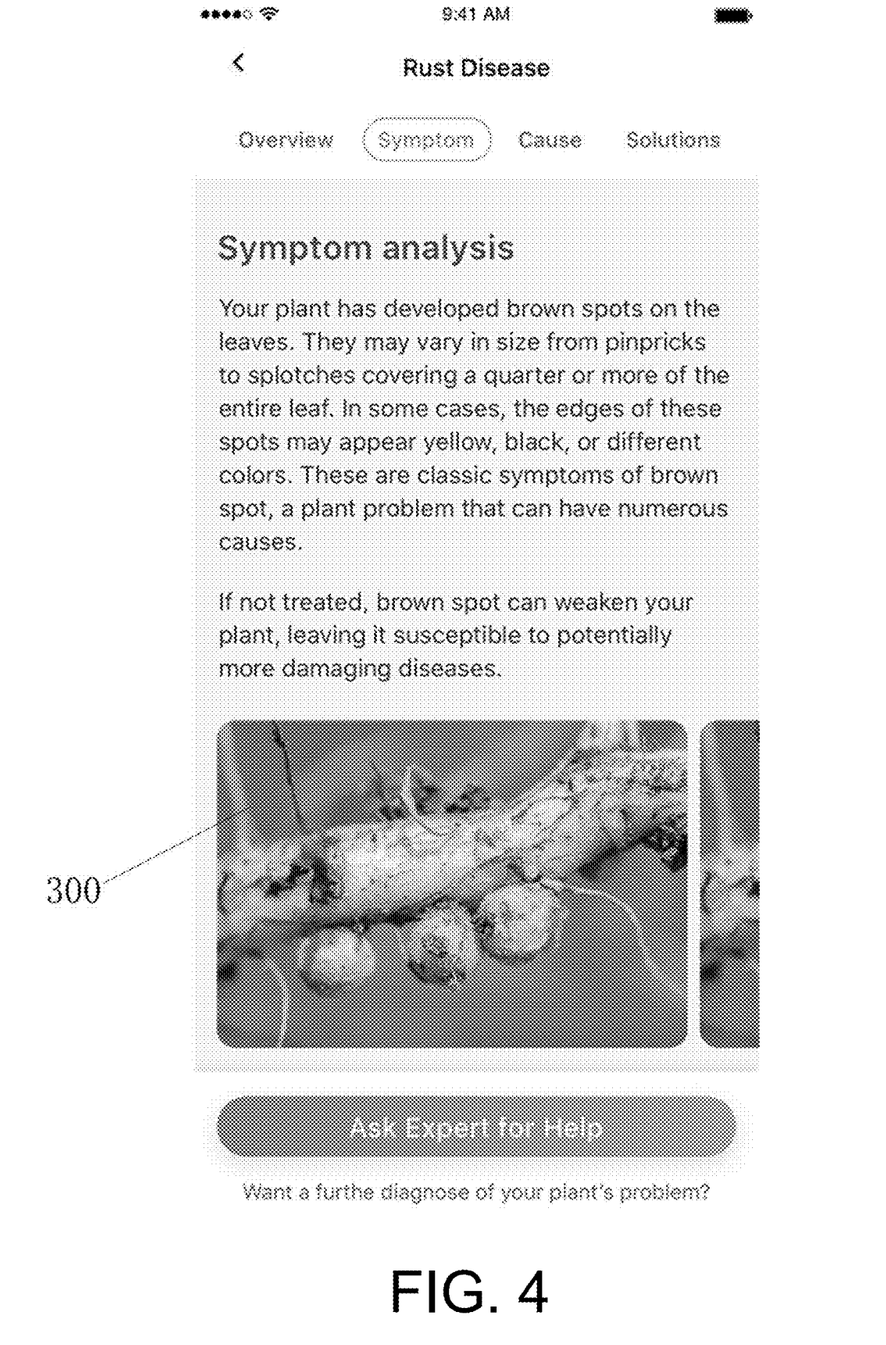
FIG. 4 is a partial schematic view of a suspected disease information display page including a reference image according to an embodiment of the present disclosure.

FIG. 4 is a partial schematic view of a suspected disease information display page including a reference image according to an embodiment of the present disclosure. As shown in FIG. 4, a reference image 300 (the image located at the bottom of FIG. 4) may be included in at least part of the diagnosis information that may be changed adaptively along with the plant image. The reference image at least corresponds to the disease information, and the reference image is similar to the plant image. In this way, the output diagnosis information may no longer be fixed, but may be replaced with the related pictures used for explanation in the output diagnosis information according to the plant images input by the user, so that these pictures used for explanation are more similar to the plant images taken by the user. In this way, the user will not feel that the pictures in the output diagnosis information are too different from the plant images taken by the user, and it is possible to avoid causing trouble to the user and improve the user experience.

In some embodiments, extracting the diagnosis information of the suspected disease from the content management system and outputting the diagnosis information includes:
   determining the corresponding candidate reference image library according to the suspected disease in the content management system;
   in the candidate reference image library, based on the similarity with the plant image and/or the matching degree with the species information, determining the extracted one or more reference images and a priority corresponding to each of the one or more reference images; and
   outputting the one or more reference images so that the one or more reference images are arranged in sequence from high to low according to priority.

Reference images may be pre-placed in the candidate reference image library of the content management system. In the candidate reference image library, the corresponding candidate reference image library is determined based on the disease result; in the candidate reference image library, the extracted one or more reference images and a priority corresponding to each of the one or more reference images are determined based on the similarity with the plant image and/or the matching degree with the species information; then the one or more reference images are output so that the one or more reference images are arranged in sequence from high to low according to priority.

Each reference image in the content management system may be marked with corresponding species information UID1 (UID1 may include species, varieties, subspecies, genus, family, etc.) and disease result UID2. Based on UID1 and UID2, reference images may be classified, filtered, etc. For example, according to UID2, one or more reference images corresponding to each disease result may be combined into a candidate reference image library corresponding to the corresponding disease results. When selecting the required reference image from the reference image library, the type of plant corresponding to the reference image may be determined based on the UID1 marked on each reference image. By displaying a reference image, the user may better identify the disease of the plant, especially when the image of the plant taken by the user is unclear or the captured portion is difficult to be identified.

Under normal circumstances, the reference image with higher similarity to the plant image and higher matching degree with the species information will have a higher priority. Reference images with higher priority may be displayed first or arranged at a front position compared to multiple displayed reference images so the user may see the reference image more easily.

In some embodiments, in the candidate reference image library, based on the similarity with the plant image and/or the matching degree with the species information, the step of determining the extracted one or more reference images and a priority corresponding to each of the one or more reference images includes: searching for a candidate reference image that matches the species information of the plant image from the candidate reference image library according to the species information of the plant image and outputting and displaying the candidate reference image as the first reference image set; when the first reference image set is not established, searching for a candidate reference image that matches the genus information of the plant image from the candidate reference image library and outputting and displaying the candidate reference image as the second reference image set; when the first reference image set and the second reference image set are not established, searching for a candidate reference image that matches the family information of the plant image from the candidate reference image library and outputting and displaying the candidate reference image as the third reference image set; when the first reference image set, the second reference image set and the third reference image set are not established, determining the preset default image corresponding to the suspected disease as the reference image.

That is, the reference image is selected based on the plant UID1 obtained after species identification is performed on the plant image. The species UID1 is searched from the candidate reference image library corresponding to the current suspected disease. If there is no successful match in species, then matching is performed on the genus information; if there is no successful match in genus information, then matching is performed on the family information; if there is no successful match in the family information, the default image in the disease article will be displayed directly. The detailed page defaults to a maximum of 3 reference images. When the number of reference images is 2 to 3, the format is adjusted to a horizontally slidable style. When there is only one reference image, only one reference image is displayed.

In some embodiments, in the content management system, the step of determining the corresponding candidate reference image library according to the suspected disease includes:

when the species information of the plant image includes a result with a confidence level greater than the first preset value, determining the corresponding candidate reference image library based on the species information and the suspected disease corresponding to the species information; otherwise, determining the corresponding candidate reference image library based on the species information with the top second preset value in the confidence level ranking and the suspected disease corresponding to the species information. For example, when there is a result with a confidence level of 0.9 or above in the plant image recognition species information result, the candidate reference image library corresponding to the suspected disease of the species is output as the basis of the similarity map, otherwise the candidate reference image library of the top three confidence level-ranked species corresponding to the suspected disease is taken as the basis of the similarity map. In this way, it is possible to narrow the number of reference images for the current disease and speed up the matching.

Normally, the display ratio of the images in the displayed diagnosis information is between 3:2 and 1:1, thus providing a better display effect. However, the scale of the reference image filtered from the candidate reference image library may not fit the above display scale. Typically, such an image may be stretched or cropped to fit the display ratio. However, considering that stretching the reference image may cause the features of some diseases to be deformed, which is unfavorable for the user to identify the disease clearly, so in an exemplary embodiment, the reference image may be processed by cropping.

The edge area of the original image forming the reference image is cropped so that the ratio of the cropped reference image matches the preset display ratio, and the image features corresponding to the disease results in the reference image are located in the central area of the reference image.

Specifically, based on the area recognition model, when selecting reference image materials for the content management system, images whose image features corresponding to the disease results are located in the edge areas will be removed or ignored. These images will not be included in the content management system. Alternatively, the image may be processed, for example, cropped while the image is stored in the content management system. Alternatively, after determining the reference image to be output based on the plant image, the selected reference image of the content management system may be processed, for example, cropped, and then output. Of course, in some other embodiments, it is also possible to predetermine the locations of the features of the disease in the original image forming the reference image, and these locations are avoided during the cropping process.

In some embodiments, the method further includes: when there are multiple suspected disease areas, using a disease diagnosis model to pre-recognize the multiple suspected disease areas, and obtain disease pre-recognition results of the multiple suspected disease areas respectively; when there are two or more disease pre-recognition results in the multiple suspected disease areas, the step of marking and displaying the suspected disease area according to the first preset mode includes: performing information marking respectively on the suspected disease areas with different disease pre-recognition results; when any of the suspected disease areas or the information marked thereon is clicked, displaying the information about the suspected disease according to the second preset mode.

In some embodiments, after acquiring multiple suspected disease areas on the plant image uploaded by the user, the multiple suspected disease areas on the plant image uploaded by the user may be pre-recognized by the disease diagnosis model. When multiple different diseases are diagnosed in the multiple suspected disease areas in the plant image uploaded by the user, a front page may be provided to display disease marking information. The red boxes for different diseases may be marked with different disease names or corresponding symbols for differentiation, thereby informing the user that the plant images captured by the user have multiple different suspected diseases. The user may click on the corresponding red box or marking to jump to the detailed information display page regarding the corresponding disease for viewing.

This embodiment also provides a readable storage medium in which a program is stored. When the program is executed, the display method for plant disease diagnosis information as described above is implemented. Further, this embodiment also provides a display system for plant disease diagnosis information, which includes a processor and a memory. A program is stored in the memory. When the program is executed by the processor, the display method for plant disease diagnosis information as described above is implemented.

Although some specific embodiments of the present disclosure have been described in detail through examples, those skilled in the art will understand that the above examples are for illustration only and are not intended to limit the scope of the disclosure. The various embodiments disclosed herein may be combined in any manner without departing from the spirit and scope of the disclosure. Those skilled in the art will further appreciate that various modifications may be made to the embodiments without departing from the scope and spirit of the disclosure. The scope of the disclosure is defined by the appended claims.

What is claimed is:

1. A display method for plant disease diagnosis information, characterized in comprising:
    acquiring a plant image;
    using a disease location detection model to recognize and process the plant image, so as to determine whether the plant image has a suspected disease area;
    if a result recognized by the disease location detection model indicates that there is at least one suspected disease area, using a marking box to mark and display the suspected disease area according to a first preset mode;
    using a disease diagnosis model to recognize and process the plant image, so as to acquire species information and determine whether the plant image has a suspected disease;
    if a result recognized by the disease diagnosis model indicates that there is at least one suspected disease, performing information display regarding the suspected disease according to a second preset mode,
    wherein the method further comprises:
        when there are a plurality of the suspected disease areas, using the disease diagnosis model to pre-recognize the plurality of suspected disease areas, and obtaining disease pre-recognition results of the plurality of suspected disease areas respectively;
        when the plurality of suspected disease areas have two or more of the disease pre-recognition results, using the marking box to mark and display the suspected disease areas according to the first preset mode comprises: performing information marking respectively on the suspected disease areas with the different disease pre-recognition results to mark different information;
        when any one marking box or the information marked thereon is clicked, performing information display by jumping to a detailed information display page regarding a corresponding disease.

2. The display method for the plant disease diagnosis information as claimed in claim 1, wherein using the marking box to mark and display the suspected disease area according to the first preset mode comprises: obtaining a confidence level of the marking box, and displaying at least part of the plant image centered in the marking box with a highest confidence level as a center.

3. The display method for the plant disease diagnosis information as claimed in claim 2, wherein when the number of the marking boxes with the highest confidence level is more than one, selecting the marking box whose original location is closer to the center as a centered display target.

4. The display method for the plant disease diagnosis information as claimed in claim 2, wherein when a plurality of the marking boxes are partially overlapped and an overlapping area exceeds ½ of any one of the marking boxes, retaining only the marking box having the highest confidence level.

5. The display method for the plant disease diagnosis information as claimed in claim 2, wherein when a size of the marking box is smaller than a preset minimum size, the size of the marking box is set to the preset minimum size, and when the size of the marking box is larger than a preset maximum size, the size of the marking box is set to the preset maximum size.

6. The display method for the plant disease diagnosis information as claimed in claim 1, wherein performing the information display regarding the suspected disease according to the second preset mode comprises: extracting diagnosis information of the suspected disease from a content management system and outputting the diagnosis information, in the case where a same determined suspected disease is found in different plant images, at least part of the diagnosis information changes along with the different plant images.

7. The display method for the plant disease diagnosis information as claimed in claim 6, wherein the at least part of the diagnosis information comprises a reference image, the reference image corresponds to the suspected disease, and the reference image is similar to the plant image.

8. The display method for the plant disease diagnosis information as claimed in claim 7, wherein the number of the reference images is less than or equal to 3.

9. The display method for the plant disease diagnosis information as claimed in claim 7, wherein extracting the diagnosis information of the suspected disease from the content management system and outputting the diagnosis information comprises:
    determining a corresponding candidate reference image library according to the suspected disease in the content management system;
    in the candidate reference image library, based on at least one of a similarity with the plant image and a matching degree with the species information, determining extracted one or more reference images and a priority corresponding to each of the one or more reference images; and
    outputting the one or more reference images so that the one or more reference images are arranged in sequence from high to low according to the priority.

10. The display method for the plant disease diagnosis information as claimed in claim 9, wherein in the candidate reference image library, based on at least one of the similarity with the plant image and the matching degree with the species information, determining the extracted one or more reference images and the priority corresponding to each of the one or more reference images comprises:
    searching for a candidate reference image that matches the species information of the plant image from the candidate reference image library according to the species information of the plant image and outputting and displaying the candidate reference image as a first reference image set;

when the first reference image set is not established, searching for a candidate reference image that matches genus information of the plant image from the candidate reference image library and outputting and displaying the candidate reference image as a second reference image set;

when the first reference image set and the second reference image set are not established, searching for a candidate reference image that matches family information of the plant image from the candidate reference image library and outputting and displaying the candidate reference image as a third reference image set;

when the first reference image set, the second reference image set and the third reference image set are not established, determining a preset default image corresponding to the suspected disease as the reference image.

11. The display method for the plant disease diagnosis information as claimed in claim 9, wherein determining the corresponding candidate reference image library according to the suspected disease in the content management system comprises:

when the species information of the plant image comprises a result with a confidence level greater than a first preset value, determining a corresponding candidate reference image library based on the species information and the suspected disease corresponding to the species information; otherwise, determining the corresponding candidate reference image library based on species information with a top second preset value in a confidence level ranking and the suspected disease corresponding to the species information.

12. The display method for the plant disease diagnosis information as claimed in claim 1, wherein using the disease diagnosis model to recognize and process the plant image, so as to obtain the species information and determine whether the plant image has the suspected disease comprises:

pre-recognizing the plant image by using the disease diagnosis model to obtain a disease pre-recognition result;

if a confidence level of the disease pre-recognition result is less than a third preset value, outputting an interactive question associated with the disease pre-recognition result; and obtaining an answer to the interactive question, and obtaining suspected disease result information of the plant image based on the answer.

13. The display method for the plant disease diagnosis information as claimed in claim 12, wherein the interactive question comprises at least two option branches, and the answer to the interactive question is selected from the at least two option branches.

14. The display method for the plant disease diagnosis information as claimed in claim 13, wherein the interactive question comprises at least two levels, and the different option branch at an upper level corresponds to a different branch question at a lower level.

15. The display method for the plant disease diagnosis information as claimed in claim 12, wherein each of the disease pre-recognition results is associated with the at least one interactive question, or the at least two disease pre-recognition results are associated with the at least one interactive question.

16. A non-transitory readable storage medium, in which a program is stored, characterized in that when the program is executed, the display method for the plant disease diagnosis information as claimed in claim 1 is implemented.

17. A display system for plant disease diagnosis information, characterized in comprising a processor and a memory, wherein a program is stored in the memory, when the program is executed by the processor, the display method for the plant disease diagnosis information as claimed in claim 1 is implemented.

* * * * *